United States Patent
Aberdam et al.

(10) Patent No.: US 12,521,392 B2
(45) Date of Patent: Jan. 13, 2026

(54) METHODS AND COMPOSITIONS FOR PROMOTING WOUND HEALING IN A SUBJECT SUFFERING FROM ECTODERMAL DYSPLASIAS

(71) Applicants: INSERM (INSTITUT NATIONAL DE LA SANTÉ ET DE LA RECHERCHE MÉDICALE), Paris (FR); UNIVERSITÉ DE PARIS, Paris (FR); ASSISTANCE PUBLIQUE-HÔPITAUX DE PARIS (APHP), Paris (FR)

(72) Inventors: Daniel Aberdam, Paris (FR); Edith Aberdam, Paris (FR); Smail Hadj-Rabia, Paris (FR); Salvatore Cisternino, Paris (FR)

(73) Assignees: INSERM (INSTITUT NATIONAL DE LA SANTÉ ET DE LA RECHERCHE MÉDICALE), Paris (FR); UNIVERSITÉ DE PARIS, Paris (FR); ASSISTANCE PUBLIQUE-HÔPITAUX DE PARIS (APHP), Paris (FR)

(*) Notice: Subject to any disclaimer, the term of this patent is extended or adjusted under 35 U.S.C. 154(b) by 1063 days.

(21) Appl. No.: 17/258,894

(22) PCT Filed: Jul. 15, 2019

(86) PCT No.: PCT/EP2019/068962
§ 371 (c)(1),
(2) Date: Jan. 8, 2021

(87) PCT Pub. No.: WO2020/016155
PCT Pub. Date: Jan. 23, 2020

(65) Prior Publication Data
US 2021/0322418 A1    Oct. 21, 2021

(30) Foreign Application Priority Data
Jul. 16, 2018   (EP) .................... 18305964

(51) Int. Cl.
*A61K 31/517*    (2006.01)
*A61K 31/439*    (2006.01)
*A61P 17/02*     (2006.01)

(52) U.S. Cl.
CPC .......... *A61K 31/517* (2013.01); *A61K 31/439* (2013.01); *A61P 17/02* (2018.01)

(58) Field of Classification Search
None
See application file for complete search history.

(56) References Cited

FOREIGN PATENT DOCUMENTS

| WO | 2010/113117 A2 | 7/2010 |
| WO | 2011/090741 A2 | 7/2011 |
| WO | 2015/150472 A2 | 8/2015 |

OTHER PUBLICATIONS

Russo et al: "Protein aggregation of the p63 transcription factor underlies severe skin fragility in AEC syndrome" Proceedings of the National Academy of Sciences (PNAS), vol. 115, No. 5, pp. E906-E915, Jan. 30, 2018.
Shalom-Feuerstein et al: "Impaired epithelial differentiation of induced pluripotent stem cells from ectodermal dysplasia-related patients is rescued by the small compound APR-246/PRIMA-1MET", Proceeding of the National Academy of Sciences, vol. 110, No. 6, pp. 2152-2156, Jan. 25, 2013.
Shen et al: "APR-246/PRIMA-1MET rescues epidermal differentiation in skin keratinocytes derived from EEC syndrome patients with p63 mutations", Proceedings of the National Academy of Sciences of the United States of America, vol. 110, No. 6, pp. 2157-2162, Jan. 25, 2013.
Soares et al: "Master regulatory role of p63 in epidermal development and disease", CMLS Cellular and Molecular Life Sciences, vol. 75, No. 7, pp. 1179-1190, Nov. 4, 2017.

*Primary Examiner* — Adam C Milligan
*Assistant Examiner* — Jed A Kucharczk
(74) *Attorney, Agent, or Firm* — WCF IP

(57) ABSTRACT

The present invention relates to a method for promoting wound healing in a subject suffering from Ectodermal dysplasia in need thereof comprising a step of administering subcutaneously, intradermally or topically to said subject a therapeutically effective amount of a compound which restores the activity of p63. Inventors have performed a primary culture of patient keratinocytes suffering from ectodermal dysplasias with two compounds which restore the activity of p63 (e.g. STIMA-1 and/or PRIMA-1Met). They have shown that there is an important differentiation of the keratinocytes of said patient compared to the cells not treated with these compounds. They observed that the activity of p63 mutated is restored, thus the proliferation and differentiation of keratinocytes from the patient are activated. Moreover, inventors have used PRIMA-1Met by topical application on a young patient suffering from ectodermal dysplasias and shown that said patient presents an improvement on her hand. Typically, severe skin erosions (on hands and feet) are healing when PRIMA-1Met is administered topically on the hand.

8 Claims, 2 Drawing Sheets

Figure 1:
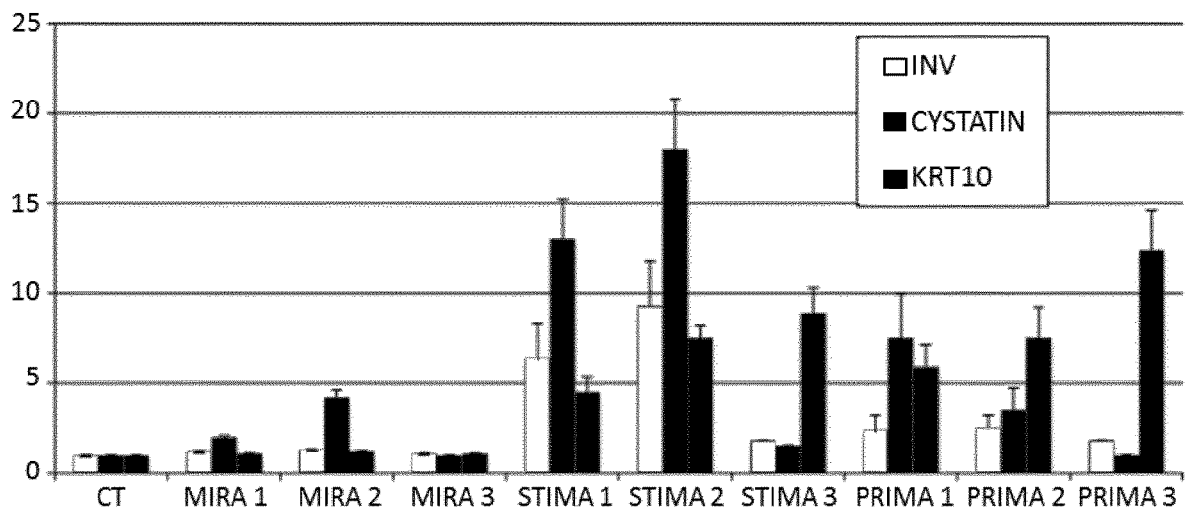

METHODS AND COMPOSITIONS FOR PROMOTING WOUND HEALING IN A SUBJECT SUFFERING FROM ECTODERMAL DYSPLASIAS

FIELD OF THE INVENTION

The present invention is in the field of dermatology, more particularly, the invention relates to methods and composition for promoting would healing in a subject suffering from ectodermal dysplasias (ED).

BACKGROUND OF THE INVENTION

Wound healing is a process which starts immediately after an injury and may continue for months or years, and is essentially the same for all types of wounds. Variations in wound healing are the result of differences in location, severity of the wound, and the extent of injury to the tissues. Other factors affecting wound healing are the age, nutritional status and general state of health of a subject and its body reserves and resources for the regeneration of tissue. The wound healing process is divided into 3 or 4 distinct phases: (i) coagulation and homeostasis; (ii) inflammation; (iii) proliferation; and (iv) wound remodelling with scar tissue formation.

There are many diseases cause wound in the structure of an organ or tissue, including epithelium, connective tissue, and muscle tissue in the subject such as inflammatory skin disease; bacterial skin infection; fungal and yeast infection; viral infection; and infection caused by small macro organisms such as mites; diabetes or aging process.

For some skin diseases, more particularly rare diseases such as Ectodermal dysplasias (ED) which is a malformation of ectodermal structures such as skin, hair, teeth, nails, nerves, sweat glands and other parts of the body. The ectodermal dysplasias are congenital, diffuse, and non-progressive. To date, more than 192 distinct disorders have been described. It comprises three clinically almost indistinguishable subtypes with impaired sweating as the key symptom: Christ-Siemens-Touraine (CST) syndrome (X-linked), autosomal recessive (AR), and autosomal dominant (AD) HED, as well as a fourth rare subtype with immunodeficiency as the key symptom (HED with immunodeficiency). Ankyloblepharon-ectodermaldefects-cleft lip/palate (AEC) syndrome is a form of ectodermal dysplasia. It is defined by a group of about 150 conditions characterized by abnormal development of ectodermal tissues including the skin, hair, nails, teeth, and sweat glands.

The diagnosis is often established after hyperthermic episodes or with delayed teeth eruption. Lack of sweat glands can be evidenced by a skin biopsy or non-invasively by confocal microscopy or graphite prints of feet/hands. Sweat gland function can be assessed by quantifying pilocarpine-induced sweat production. Diagnosis is confirmed by genetic testing. If the disease is not diagnosed early enough in infancy, hyperthermia may lead to brain damage and eventually death. Moreover, patients suffering from ectodermal dysplasias have sociability problems.

There is no specific treatment for this disorder. Instead, symptoms are treated as needed. Typically, the subject suffering from ED has the following solution to reduce or relieve the symptoms and pain such as: wear a wig and dentures to improve appearance, use artificial tears to replace normal tearing and prevent drying of the eyes, spray the nostrils with saline nose spray often to remove debris and prevent infection; take cooling water baths or use water sprays to keep a normal body temperature.

Accordingly, there is a need to find new tool to treat this kind of pathologies.

SUMMARY OF THE INVENTION

The present invention relates to a method for promoting wound healing in a subject suffering from Ectodermal dysplasia (ED) in need thereof comprising a step of administering subcutaneously, intradermally or topically to said subject a therapeutically effective amount of a compound which restores the activity of p63. In particular, the invention is defined by claims.

DETAILED DESCRIPTION OF THE INVENTION

Inventors have performed a primary culture of patient keratinocytes suffering from ectodermal dysplasias with two compounds which restore the activity of p63 (e.g. STIMA-1 and/or PRIMA-1$^{Met}$) They have shown that there is an important differentiation of the keratinocytes of said patient compared to the cells not treated with these compounds. They observed that the activity of p63 mutated is restored, thus the proliferation and differentiation of keratinocytes from the patient are activated.

Moreover, inventors have used PRIMA-1$^{Met}$ by topical application on a young patient suffering from ectodermal dysplasias and shown that said patient presents an improvement on her hand. Typically, severe skin erosions (on hands and feet) are healing when PRIMA-1$^{Met}$ is administered topically on the hand. For the first time, inventors have found a treatment of ectodermal dysplasias.

Accordingly, in a first aspect, the present invention relates to method for promoting wound healing in a subject suffering from Ectodermal dysplasia (ED) in need thereof comprising a step of administering subcutaneously, intradermally or topically to said subject a therapeutically effective amount of a compound which restores the activity of p63.

In a particular embodiment, the invention relates to a method for treating Ectodermal dysplasia (ED) in a subject need thereof comprising a step of administering subcutaneously, intradermally or topically to said subject a therapeutically effective amount of a compound which restores the activity of p63.

In a particular embodiment, the compound which restores the activity of p63 is STIMA-1 compound or PRIMA-1$^{MET}$ compound.

As used herein, the terms "treating" or "treatment" refer to both prophylactic or preventive treatment as well as curative or disease modifying treatment, including treatment of subject at risk of contracting the disease or suspected to have contracted the disease as well as subject who are ill or have been diagnosed as suffering from a disease or medical condition, and includes suppression of clinical relapse. The treatment may be administered to a subject having a medical disorder or who ultimately may acquire the disorder, in order to prevent, cure, delay the onset of, reduce the severity of, or ameliorate one or more symptoms of a disorder or recurring disorder, or in order to prolong the survival of a subject beyond that expected in the absence of such treatment. By "therapeutic regimen" is meant the pattern of treatment of an illness, e.g., the pattern of dosing used during therapy. A therapeutic regimen may include an induction regimen and a maintenance regimen. The phrase "induction regimen" or "induction period" refers to a therapeutic regimen (or the portion of a therapeutic regimen) that is used for the initial treatment of a disease. The general goal of an induction regimen is to provide a high level of drug to a subject during the initial period of a treatment regimen. An induction regimen may employ (in part or in whole) a "loading regimen", which may include administering a greater dose of the drug than a physician would employ during a maintenance regimen, administering a drug more frequently than a physician would administer the drug during a maintenance regimen, or both. The phrase "maintenance regimen" or "maintenance period" refers to a therapeutic regimen (or the portion of a therapeutic regimen) that is used for the maintenance of a subject during treatment of an illness, e.g., to keep the subject in remission for long periods of time (months or years). A maintenance regimen may employ continuous therapy (e.g., administering a drug at a regular intervals, e.g., weekly, monthly, yearly, etc.) or intermittent therapy (e.g., interrupted treatment, intermittent treatment, treatment at relapse, or treatment upon achievement of a particular predetermined criteria [e.g., pain, disease manifestation, etc.]).

As used, herein, the term "wound" refers to a break or discontinuity in the structure of an organ or tissue, including epithelium, connective tissue, and muscle tissue, caused by an external agent. Examples of wounds include, but are not limited to, skin wounds, bruises, ulcerations, bedsores, grazes, tears, cuts, punctures, psoriasis wounds, tympanic membrane perforations, and burns. Wound healing is a dynamic, interactive process involving soluble mediators, blood cells, extracellular matrix, and parenchymal cells. Wound healing has 3 phases that overlap in time: vascular phase and inflammation, new tissue formation including reepithelialization, and tissue remodelling. Wounds are currently treated by applying an emergency treatment to a wounded site and waiting for the wounds to spontaneously heal via the biological recovering power of their own.

As used herein, the term "promote" refers to "improve" or "enhance", the wound healing generally means increasing the speed by which the wound or perforation heals or reducing the extent of residual scar or necrotic tissue during or after healing of the wound or perforation. In a particular embodiment, the wound healing process is increased in a subject suffering from ectodermal dysplasias.

As used herein, the term "subject" refers to any mammals, such as a rodent, a feline, a canine, and a primate. Particularly, in the present invention, the subject is a human afflicted with or susceptible to be afflicted with ectodermal dysplasias. More particularly, the subject is afflicted with or susceptible to be afflicted by ED syndromes. In another embodiment, the subject is afflicted with or susceptible to be afflicted by ED syndromes including but not limited to the following syndromes: Ectrodactyly, Ectodermal dysplasia, and facial Clefting syndrome (EEC), limbal deficiency (cornea), Ankyloblepharon-Ectodermal defects-Cleft lip/palate syndrome (AEC) (or Hays-well syndrome, including Rapp-Hodgkin syndrome), acrodermato-ungueal-lacrimal-tooth syndrome (ADULT), Limb-Mammary Syndrome (LMS), split hand/foot malformation type 4 (SHFM4).

In a particular embodiment, the subject is afflicted with or susceptible to be afflicted by Ankyloblepharon-Ectodermal defects-Cleft lip/palate syndrome (AEC). In a particular embodiment, the subject has an eyelid condition known as ankyloblepharon filiforme adnatum, in which strands of tissue partially or completely fuse the upper and lower eyelids. In a particular embodiment, the patient is afflicted with severe skin erosions and scalp infections.

As used herein, the term "ectodermal dysplasias" is an autosomal dominant condition and refers to a malformation of ectodermal structures such as skin, hair, teeth, nails, nerves, sweat glands and other parts of the body. Dysplasia means abnormal development of cells or tissues. There are many different types of ectodermal dysplasias. Each type of dysplasia is caused by specific mutations in p63. More particularly, disease-causative mutations in p63 are selected but not limited to the mutations in DBD domain such as: L162P, L163C, Y192C/C, K193E, K194E, V202M, R204L/Q/W, H208Y, R227Q, S272N, C269Y, C273Y, R279C/H/Q, R280C/H/S, C306Y/R, R304P/Q/W, P309S, D312G/H/N, C308S/Y, R313G, A315E; in SAM domain such as 1456InsA, F513S/V, C519R, 1572 InsA, 1576 DEITT, Q536L, I537T, D544V/Y, L545P, G561D/V, 3'ssintron 10, I510T, L514F/S/V, G518V, C522G/W, L523P, G530V, T533P, 534InsF, S541F/P/Y, P551L, R555P, I558T, 1697DelG; in TI domain such as 1709DelA, 1721DelC, 1742 DelC, 1743 DelAA, 1787 DelG, R598L, D601V. In a particular embodiment, the ectodermal dysplasias are caused by the mutations in SAM domain of p63.

In a particular embodiment, the ectodermal dysplasia is Ankyloblepharon-ectodermal defects-cleft lip/palate (AEC).

As used herein, the term "a compound which restores the activity of p63" refers to a compound which allows to obtain the properties of the p63 wild type when p63 is mutated. p63 also known as tumor protein p63 (TP63) is a member of the p53 family of transcription factors. p63 encodes for two main isoforms by alternative promoters (TAp63 and ΔNp63). ΔNp63 is involved in multiple functions during skin development and in adult stem/progenitor cell regulation. Whereas TAp63 has been mostly restricted to its apoptotic function. p63 mutations associated with the ED syndrome are point mutations in the DNA-binding domain affecting all isoforms. In the context of the invention, the compound restores the proliferation and development of epithelial cells and epidermal cells. In a particular embodiment, the compound is STIMA-1 compound or PRIMA-1$^{Met}$ compound.

In particular embodiment, the compound which restore the activity of p63 rescue epidermal cell differentiation. As used herein, the term "PRIMA-1$^{Met}$" also known as APR-246 is a small molecule characterized by the following formula in the art:

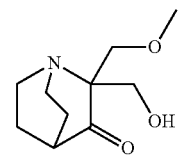

It is a methylated derivative and structural analog of PRIMA-1 which is a p53 re-activator and inductor of massive apoptosis. PRIMA-1$^{Met}$, also known as APR-246 and 2-(hydroxymethyl)-2-(methoxymethyl)quinuclidin-3-one ($C_{10}H_{17}NO_3$) has the following CAS number: 5291-32-7.

As used herein, the term "STIMA-1", also known as 2-vinyl-4H-quinazolinol ($C_{10}H_8N_2O$), refers to the p53 activator VII and is referenced under CAS 91634-12-7. This small molecule modulates the biological activity of p53 and has the following structure in the art:

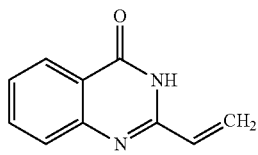

As used herein the terms "administering" or "administration" refer to the act of injecting or otherwise physically delivering a substance as it exists outside the body (e.g., PRIMA-1$^{Met}$ and/or STIMA-1) into the subject, such as by mucosal, intradermal, intravenous, subcutaneous, intramuscular delivery and/or any other method of physical delivery described herein or known in the art. When a disease, or a symptom thereof, is being treated, administration of the substance typically occurs after the onset of the disease or symptoms thereof. When a disease or symptoms thereof, are being prevented, administration of the substance typically occurs before the onset of the disease or symptoms thereof. In a particular embodiment, the subject is administered subcutaneously, intradermally or topically with a compound which restores the activity of p63 (e.g., PRIMA-1$_{Met}$ and/or STIMA-1). In a further embodiment, the method according to the invention, wherein STIMA-1 compound or PRIMA-1Met compound are administered to the subject in need thereof simultaneously, separately or sequentially. As used herein, the term "administration simultaneously" refers to administration of 2 active ingredients by the same route and at the same time or at substantially the same time. The term "administration separately" refers to an administration of 2 active ingredients at the same time or at substantially the same time by different routes. The term "administration sequentially" refers to an administration of 2 active ingredients at different times, the administration route being identical or different.

In a particular embodiment, a i) PRIMA-1$^{Met}$ compound, and ii) STIMA-1 compound, as a combined preparation for simultaneous, separate or sequential use in the method for promoting wound healing in a subject suffering from ED. The method according to the invention, wherein the compound is formulated as a cream, an ointment, or gel. The method according to the invention, wherein the compound is formulated as an ophthalmic drop or an ophthalmic ointment.

In another particular embodiment, a i) PRIMA-1$^{Met}$ compound, and ii) STIMA-1 compound, as a combined preparation for simultaneous, separate or sequential for use in the method for treating ED in a subject suffering in need thereof.

A "therapeutically effective amount" is intended for a minimal amount of active agent which is necessary to impart therapeutic benefit to a subject. For example, a "therapeutically effective amount" to a subject is such an amount which induces, ameliorates or otherwise causes an improvement in the pathological symptoms, disease progression or physiological conditions associated with or resistance to succumbing to a disorder. It will be understood that the total daily usage of the compounds of the present invention will be decided by the attending physician within the scope of sound medical judgment. The specific therapeutically effective dose level for any particular subject will depend upon a variety of factors including the disorder being treated and the severity of the disorder; activity of the specific compound employed; the specific composition employed, the age, body weight, general health, sex and diet of the subject; the time of administration, route of administration, and rate of excretion of the specific compound employed; the duration of the treatment; drugs used in combination or coincidental with the specific compound employed; and like factors well known in the medical arts. For example, it is well within the skill of the art to start doses of the compound at levels lower than those required to achieve the desired therapeutic effect and to gradually increase the dosage until the desired effect is achieved. However, the daily dosage of the products may be varied over a wide range from 0.01 to 1,000 mg per adult per day. Typically, the compositions contain 0.01, 0.05, 0.1, 0.5, 1.0, 2.5, 5.0, 10.0, 15.0, 25.0, 50.0, 100, 250 and 500 mg of the active ingredient (PRIMA-1$^{Met}$ and/or STIMA-1) for the symptomatic adjustment of the dosage to the subject to be treated. A medicament typically contains from about 0.01 mg to about 500 mg of the active ingredient, preferably from 1 mg to about 100 mg of the active ingredient. An effective amount of the drug is ordinarily supplied at a dosage level from 0.0002 mg/kg to about 20 mg/kg of body weight per day, especially from about 0.001 mg/kg to 7 mg/kg of body weight per day. In a particular embodiment, the subject is administered with 5 mg/day of PRIMA-1$^{MET}$ and 0.7 mg/day of STIMA-1 simultaneously, sequentially or separately.

In a second aspect, the invention relates to a pharmaceutical composition comprising a compound which restores the activity of p63. The pharmaceutical composition according the invention, wherein the compound is i) STIMA-1 compound or ii) PRIMA-1$^{Met}$ compound.

The compound which restores the activity of p63 as defined above and the pharmaceutical combination according to the invention, may be combined with pharmaceutically acceptable excipients, and optionally sustained-release matrices, such as biodegradable polymers, to form pharmaceutical compositions. "Pharmaceutically" or "pharmaceutically acceptable" refer to molecular entities and compositions that do not produce an adverse, allergic or other untoward reaction when administered to a mammal, especially a human, as appropriate. A pharmaceutically acceptable carrier or excipient refers to a non-toxic solid, semi-solid or liquid filler, diluent, encapsulating material or formulation auxiliary of any type.

The pharmaceutical composition of the present invention for oral, sublingual, subcutaneous, intramuscular, intravenous, transdermal, local or rectal administration, the active principle, alone or in combination with another active principle, can be administered in a unit administration form, as a mixture with conventional pharmaceutical supports, to animals and human beings. Suitable unit administration forms comprise oral-route forms such as tablets, gel capsules, powders, granules and oral suspensions or solutions, sublingual and buccal administration forms, aerosols, implants, subcutaneous, transdermal, topical, intraperitoneal, intramuscular, intravenous, subdermal, transdermal, intrathecal and intranasal administration forms and rectal administration forms.

In a particular embodiment, the pharmaceutical composition (PRIMA-1$^{MET}$ and/or STIMA-1) is formulated as a cream, an ointment, or gel.

In another embodiment, the pharmaceutical composition (PRIMA-1$^{MET}$ and/or STIMA-1) is formulated as an ophthalmic drop or an ophthalmic ointment.

Typically, the pharmaceutical compositions contain vehicles which are pharmaceutically acceptable for a formulation capable of being administered to the subject by intradermally subcutaneously or topically. It must be stable under the conditions of manufacture and storage and must be preserved against the contaminating action of microorganisms, such as bacteria and fungi. Solutions comprising compounds of the invention as free base or pharmacologically acceptable salts can be prepared in water suitably mixed with a surfactant, such as hydroxypropylcellulose. Dispersions can also be prepared in glycerol, liquid polyethylene glycols, and mixtures thereof and in oils. Under ordinary conditions of storage and use, these preparations contain a preservative to prevent the growth of microorganisms. The compound which restores the activity of p63 (PRIMA_1$^{MET}$ and/or STIMA-1) can be formulated into a composition in a neutral or salt form. Pharmaceutically acceptable salts include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. The carrier can also be a solvent or dispersion medium containing, for example, water, ethanol, polyol (for example, glycerol, propylene glycol, and liquid polyethylene glycol, and the like), suitable mixtures thereof, and vegetables oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminium monostearate and gelatin. Sterile injectable solutions are prepared by incorporating the active polypeptides in the required amount in the appropriate solvent with several of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof. Upon formulation, solutions will be administered in a manner compatible with the dosage formulation and in such amount as is therapeutically effective. The formulations are easily administered in a variety of dosage forms, such as the type of injectable solutions described above, but drug release capsules and the like can also be employed. For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous and intraperitoneal administration. In this connection, sterile aqueous media which can be employed will be known to those of skill in the art in light of the present disclosure. For example, one dosage could be dissolved in 1 ml of isotonic NaCl solution and either added to 1000 ml of hypodermoclysis fluid or injected at the proposed site of infusion. Some variation in dosage will necessarily occur depending on the condition of the subject being treated. The person responsible for administration will, in any event, determine the appropriate dose for the individual subject.

The pharmaceutical composition according to the invention, further is formulated with Seraqua™ or Versatile™ Rich cream. Typically, the pharmaceutical composition (PRIMA-1$^{MET}$ and/or STIMA-1) is solubilized in the water and Seraqua™ is added to the composition to obtain a homogenized pharmaceutical composition. Seraqua™ is composed by the following ingredients: purified water, glycerin, glycerol, propanediol, Oil *Helianthus annuus* seeds, prolyglyceryl-3-diidsostearate, tocopheryl acetate, polyacrylate-13, dimethicone, phenoxyethanol (0.5%) polyisobuten, gomme xanthane, acide benzoic and polysorbate 20.

In a further embodiment, the pharmaceutical composition is solubilized in the water and Versatile™ Rich cream. Versatile™ Rich cream is composed of the following ingredients: Aqua purificata, olus oil, cetearyl alcohol, glyceryl stearate, dicaprylyl carbonate, polysorbate 60, isohexadecane, isododecane, lecithin, PEG-75 stearate, polyacrylate-13, tocopheryl acetate, glycerin, polyisobutene, C13-C15 alkane, alcohol, disodium EDTA, simethicone, benzoic acid, sorbic acid, polysorbate 20, sodium hydroxide.

For a composition by therapeutic unity (e.g. for cream tube 30 g), the pharmaceutical composition can be performed by adding 10 to 20 mg of PRIMA-1$^{MET}$, 0.1 to 5 ml of water purified and Seraqua™ utility to obtain a total mass of 30 g.

In particular embodiment, for a composition by therapeutic unity (e.g. for cream tube 30 g), the pharmaceutical composition is performed by adding 18 mg of PRIMA-1$^{MET}$, 0.5 ml of water purified and Seraqua™ unity to obtain a total mass of 30 g.

The pharmaceutical composition as described above does not present any inflammations on the application site.

The pharmaceutical composition according to the invention, for use in the therapy.

The pharmaceutical composition according to the invention, for use in the treatment of Ectodermal dysplasia (ED).

The pharmaceutical composition according to the invention, for use in the promoting wound healing in a subject suffering from ED.

The invention will be further illustrated by the following figures and examples. However, these examples and figures should not be interpreted in any way as limiting the scope of the present invention.

FIGURES

FIG. 1: Representative q-RT-PCR analysis on differentiated keratinocytes isolated from an AEC patient (C537T). From day 0, the cells were treated with either vehicle (CT), PRIMA-1$^{MET}$ or STIMA-1 as indicated. Involucrin (INV), Cystatin and keratin 10 (KRT10) gene expression were tested in triplicate in two independent experiments.

Figure 2:
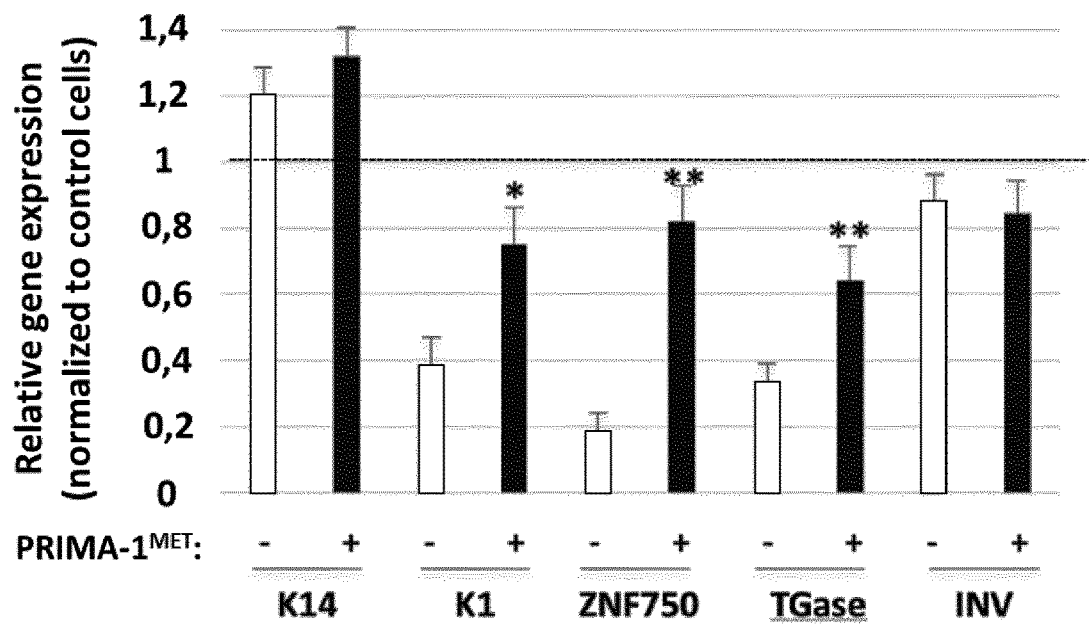

FIG. 2: Altered epidermal differentiation of patient 1 KCs rescued by PRIMA-1$^{MET}$. Patient 1 KCs are not differentiating properly but can be rescued by PRIMA-1$^{MET}$ treatment as illustrated by qRT-PCR analyses of specific markers of differentiation. Bar scale: 100 μm.

Figure 3:
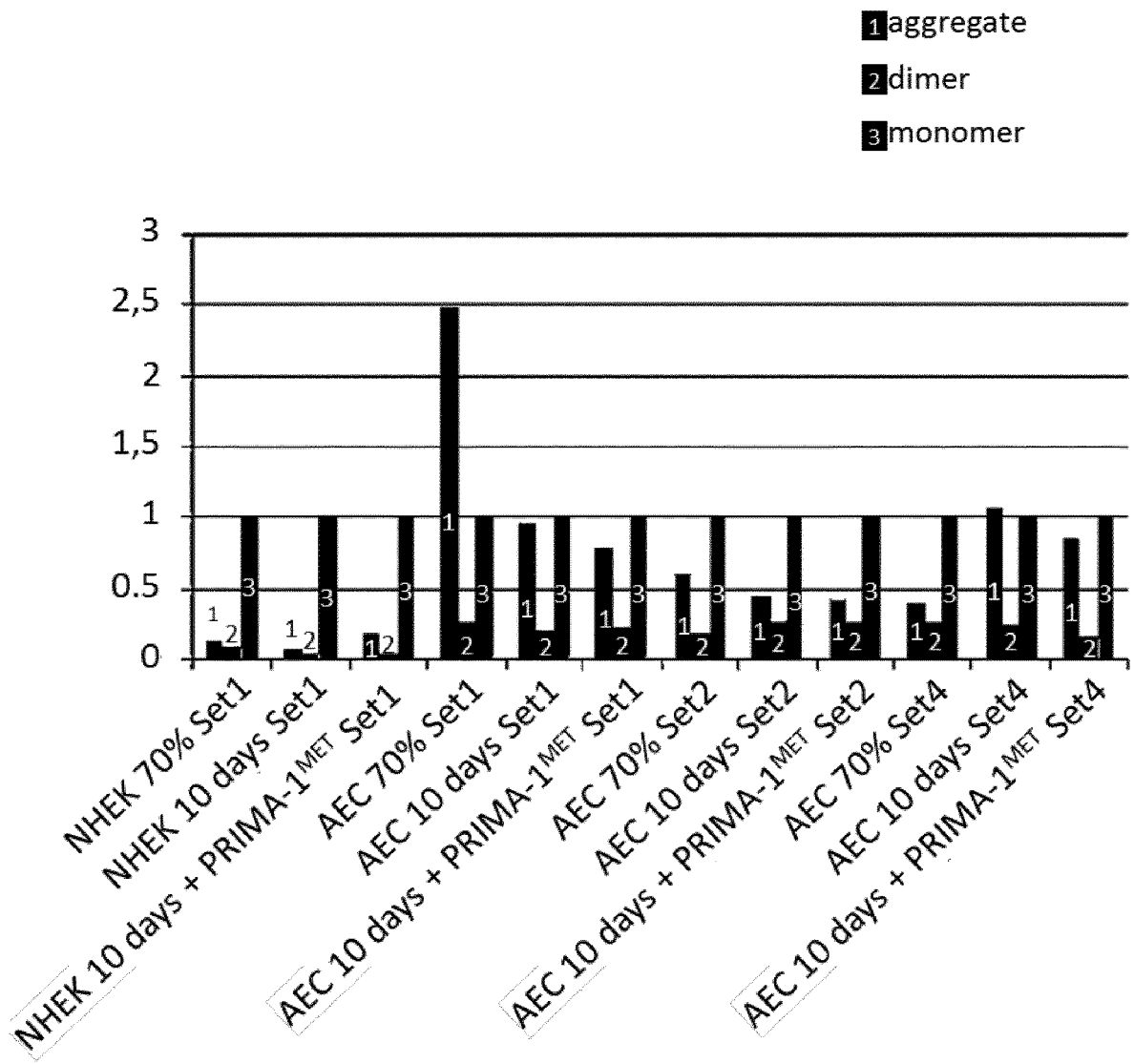

FIG. 3: Topical treatment of the patient 1 erosions with formulated PRIMA-1$^{MET}$. Protein extracts were collected from WT and patient 1 KCs at confluence and after 10 days of differentiation and loaded onto non denaturing gel for Western blot analysis with PAX6-specific antibody. Quantification of the bands.

EXAMPLE 1

Material & Methods 4 mm skin biopsy was collected from an AEC patient (9 year old). After dispase treatment ON at 4° C., the epidermis was separated from the dermis and the primary cells were grown on defined medium (KFSM) during 2 passages in 24-well plates. At confluency, calcium concentration was raised to 1.5 mM to induce epidermal stratification/differentiation during 7 days. Cells were untreated (CT) or treated with compounds. Medium was changed daily. n=6 (for doses for each compound, see Table below).

Results

Inventors have performed a primary culture of patient keratinocytes suffering from ectodermal dysplasias with two compounds which restore the activity of p63 (e.g. STIMA-1 and/or PRIMA-1$^{Met}$). They have shown that there is an important differentiation of the keratinocytes of said patient compared to the cells not treated with these compounds (FIG. 1). They observed that the activity of p63 mutated is restored, thus the proliferation and differentiation of keratinocytes from the patient are activated. Moreover, inventors have used PRIMA-1$^{Met}$ by topical application on a young patient suffering from ectodermal dysplasias and shown that said patient presents an improvement on her hand (data not shown). Typically, severe skin erosions (on hands and feet) are healing when PRIMA-1$^{Met}$ is administered topically on the hand.

EXAMPLE 2

Material & Methods

Cell Culture and Epidermal Differentiation.

Skin biopsies of 4 mm were taken from the back arm after family consent and authorization from the French Committed of Person protection (CPP). Primary KCs were extracted and amplified as described previously (5). By raising calcium concentration to 1.5 mM at confluency, KCs underwent stratification/differentiation for 10 days. Cells were treated with 30 µM of PRIMA-1MET dissolved in keratinocyte medium two days before induction of differentiation and during the whole period of treatment, with change of medium every two days.

Formulation of PRIMA-1$^{MET}$

Since i. v. injections of PRIMA-1$^{MET}$/APR-246 were well tolerated in previous clinical cancer trials (phase 2 and 3), the French agency for health and drugs (ANSM) gave us the authorization to treat by topical dermal application two AEC patients with severe skin erosions as a compassionate care, under the responsibility of the dermatologist and the pharmacist. Quality control of PRIMA-1$^{MET}$/APR-246 pure powder (R&D Systems, Bio-Techne, France) was assessed by appropriate assays. No impurities were found beyond the recommended thresholds of the ICH Q3A, Q3C and Q3D guidelines. PRIMA-1$^{MET}$/APR-246 powder was dissolved in sterile purified water (Versylene®, Fresenius Kabi, France) to obtain a solution at 36 mg/mL. This solution was then incorporated and mixed in the ready-to-use Seraqua® hydrophilic topical cream base (Fagron, France) to obtain PRIMA-1$^{MET}$/APR-246 concentration at 0.6 mg per g of cream. Stability of PRIMA-1$^{MET}$/APR-246 in this formulation was demonstrated for three weeks when stored at 2-8° C.

qRT-PCR Analyses:

Untreated and treated AEC and control KCs were harvested as a dry pellet. RNA was then extracted using RNEasy Mini kit (Qiagen) and cDNA were synthesized from 1 µg RNA using iScript cDNA synthesis kit (Bio-Rad). Quantitative PCR were performed in triplicate using 2×SYBR Green PCR Master Mix (Absource Biotools). Expression of each gene was calculated using the $2^{-\Delta\Delta ct}$ method. Results are presented as fold change normalized to B2M house-keeping gene and relative to control KCs.

Immunofluorescence Staining:

Cells were seeded on 0.1% gelatin-coated coverslips in 24-well at 5,400 cells per well. They were fixed after 10 days of differentiation with 4% paraformaldehyde for 20 min at room temperature, incubated for 10 min in glycine 1 mM to quench PFA and permeabilized with 0.5% Triton X-100 in DPBS$^{+/+}$ (Gibco™, Life Technologies) for 7 min with 3×5 min of washing in DPBS$^{+/+}$ between each step. After blocking in 5% BSA for 30 min, cells were incubated with primary antibodies overnight at 4° C. in humidified chamber. Primary antibodies used were against CKRT1 (1/250, BioLegend), ZNF750 (HPA023012, 1/300, Sigma Aldrich), Transglutaminase (sc-25786, 1/50, Santacruz) and involucrin (19018, 1/100, Sigma). Cells were washed in DPBS+/+ and incubated with corresponding secondary antibodies (goat anti-rabbit AlexaFluor® 488 or goat anti-rabbit AlexaFluor® 594, Life Technologies) diluted at 1/3,000 in blocking buffer for 1 h at room temperature protected from light. Coverslips were finally washed, mounted on microscope slides (DAPI fluoromount-G™, Electron Microscopy Sciences) and visualized under a Nikon Eclipse Ti epifluorescence microscope equipped with an OrcaFlash 4.0 LT camera (Hamamatsu). Picture analyses were conducted using NIS-Elements software.

Protein Aggregation Tests:

$5 \times 10^5$ AEC and control KCs were seeded in 6-wells. As they became 70% confluent, they were treated with 30 µM PRIMA-1MET, or the vehicle as control, replacing the culture medium with the compound every 48 hours until the harvesting. At 100% of confluence, cells underwent differentiation by raising calcium concentration of the medium to 1.5 mM. After 10 days of differentiation, cells were lysed in native lysis buffer [25 mM Tris (pH 7.5), 150 mM NaCl, 2 mM MgCl$_2$, 20 mM CHAPS, 1 mM DTT and protease inhibitors] and incubated 1 h on ice in the presence of benzonase (Merck Millipore). Protein extracts were loaded on 3-12% Novex Bis-Tris gradient gel for BN-PAGE (Life Technologies) in 20% Glycerol and 5 mM Coomassie and analyzed by Western Blotting using p63-specific antibody (anti-p63EPR5701, ab124762, Abcam). Relative quantification of protein band intensity was performed using Image Lab Software (Bio-Rad).

Results

Phenotypical and Genotype Description of AEC Patient 1:

Patient 1 is a 9-year-old daughter of healthy non-consanguineous parents. She was referred at birth for cleft lip and palate and scalp erosions. Pregnancy and delivery were uneventful. AEC syndrome was confirmed by the identification of a missense mutation in the SAM domain of TP63 gene (c.1727T>C; p.Ile576Thr) (data not shown). Few months after birth, she developed bilateral and painful erosions of the palms and soles that never completely healed. During nine years, several therapeutic attempts were proposed based on specific dressings and topical preparations and opiate analgesics. Skin grafting was discussed. Hand retraction and toe synechiae limited walking and fine motor skills.

Patient 2 is a 15-year-old female patient born to healthy non-consanguineous parents. AEC syndrome was confirmed by the identification of a missense mutation in the SAM domain of TP63 gene c.1610T>C, p.Ile537Thr. Clinically, she presented with cleft of the palate and lip. She had abnormal nail and external ears. Since birth, she presented with complete aplasia cutis of the scalp. Despite, all medical efforts, scalp aplasia never completely healed.

Establishment of Primary AEC Epidermal Cell Lines and Epidermal Differentiation:

Biopsy was undertaken from on non-erosive region of the skin in patient 1. Primary epidermal culture was established and amplified. Stratification/differentiation was induced by raising calcium concentration of the medium to 1.5 mM. Cells were maintained for 10 days and both gene expression and immunostaining for specific differentiated epidermal markers were performed by qRT-PCR analysis. Expression of cytokeratin CKRT1 (KRT1; "K1"), ZNF750 and transglutaminase ("TGase") genes were reduced in AEC keratinocytes (KCs) of patient 1 as compared to normal KCs (FIG. 2). It suggests a delayed or altered epidermal differentiation in patient cells. Accordingly, patient 1 differentiated KCs displayed reduced nuclear ZNF750, pericellular transglutaminase and cytoplasmic KRT1 as compared to normal KCs, as detected by immunofluorescence staining (data not shown). Remarkably, in the presence of PRIMA-$1^{MET}$, these markers were efficiently rescued in AEC KCs at day 10 (data not shown). This strongly suggests that PRIMA-$1^{MET}$ efficiently rescued AEC cell differentiation. Of interest, while KRT1, transglutaminase and ZNF750 were profoundly altered in AEC differentiated KCs, involucrin was normally expressed (FIG. 2). It has been shown that involucrin does not behave like the other skin markers in wound and in psoriasis (1,2). It would be interesting to study this difference in the context of AEC.

P63 Aggregation is not Reduced by PRIMA-$1^{MET}$:

Mutant AEC p63 exerts a dominant negative effect, mainly through the formation of aggregates with WT p63 and also with the p53 family member p73 (3). We tested whether PRIMA-$1^{MET}$ rescue could be due to reduction of protein aggregation. Untreated and treated mutant and WT epidermal cells were lysed in native conditions for protein total extraction. Protein extracts were then loaded on a non-denaturing gel followed by transfer for western blot analysis with a p63-specific antibody. Protein aggregation was detected in AEC differentiated cells and not in WT cells, as expected. However, while PRIMA-$1^{MET}$ was able to rescue epidermal differentiation and corresponding specific gene expression, it did not abolish protein aggregation driven by the mutant p63 molecule (FIG. 3). This is in contrast with its disaggregation activity on mutant p53 (4). It strongly suggests that the small molecule targets epidermal cell differentiation but not p63 activity. This could suggest a more general effect of PRIMA-$1^{MET}$ on defective wound healing, like in keloids, leg ulcers or diabetic ulcers.

Improvement of Epidermal Covering:

On the basis of the in vitro results and the ongoing phase II PRIMA-1MET/APR-246 trials, we were authorized by the French Agency for Health and Drugs (ANSM) to administrate PRIMA-$1^{MET}$ to two patients under the responsibility of the dermatologist and the pharmacist. PRIMA-$1^{MET}$ was formulated onto a cream (see Mat. & Meth for compound formulation) and first applied topically on the skin of Balb/C mice for one week without any sign of irritation or cytotoxicity (not shown). After informed consent, patient 1 received 5 mg daily of PRIMA-$1^{MET}$ in SERAQUA vehicle on skin erosions. Right palm were treated daily while the left palm was treated with the vehicle alone. After after 11 weeks, the daily treatment allowed reepithelialization of the skin erosions and a drastic improvement of pain, leading to stop painkillers (data not shown). At week 33, epidermalization was almost complete but not fully cornified (data not shown).

Based on these achievements, a biopsy was undertaken from on non-erosive region of the skin in patient 2, suffering from an entire scalp erosion (data not shown). As observed with KCs from patient 1, KCs from patient 2 displayed similar epidermal stratification/differentiation alteration that was rescued by PRIMA-$1^{MET}$ (data not shown). Then, patient 2 was treated on the entire scalp erosion. Improvement of the scalp erosion was already observed after 5 weeks of topical treatment (data not shown). Within the first three weeks, oozing decreased. Epidermal growth was seen with normal skin in some areas that progressively merge. Interestingly, patient 2 gained weight (+6 kg within 3 months) and height (+4 cm during the same period). At week 17, the scalp was not fully recovered but dressings remained easier and painkillers have been stopped.

The localization of skin erosions in AEC patients could differ among patients, even with the same mutation on the SAM domain. Moreover, the erosion is always restricted to a well-defined area (data not shown) and skin biopsy in healthy area heals normally in AEC patients. There is no explanation for this puzzled fact. It is known that dermal fibroblasts are a heterogeneous cell population over the body, and they originate from different embryonic precursors. In addition, some skin areas contain more or less sweat and sebaceous glands as well as particular ion (sodium, calcium) channels that could encounter for these differences. Finding the molecular basis for such restricted and variable insults among AEC patients would help to prevent such painful and disabling skin erosions. We showed that repurposing of PRIMA-$1^{MET}$, a small compound identified as p53-reactivating drug to induce cell apoptosis of human cancer cells carrying a p53 mutation, could become an efficient treatment for local AEC erosions reported in patients with AEC syndrome. In addition, such treatment might reduce the wound healing. It might help the multidisciplinary teams to propose appropriate and early care that are limited by the lesions, i.e. clefting surgery, hearing aids. Chronic pain might be avoided. Finally, it improves quality of life and social networking in AEC patients. It remains to test whether PRIMA-$1^{MET}$ must be applied permanently or temporary and to clarify the mechanism of action of PRIMA-$1^{MET}$ on differentiated KCs.

REFERENCES

Throughout this application, various references describe the state of the art to which this invention pertains. The disclosures of these references are hereby incorporated by reference into the present disclosure.

1. Mathay C, Giltaire S, Minner F, Bera E, Hérin M, Poumay Y. Heparin-binding EGF-like growth factor is induced by disruption of lipid rafts and oxidative stress in keratinocytes and participates in the epidermal response to cutaneous wounds. *J Invest Dermatol.* 2008 March; 128(3):717-27.
2. Watanabe S, Wagatsuma K, Ichikawa E, Takahashi H. Abnormal distribution of epidermal protein antigens in psoriatic epidermis. *J Dermatol.* 1991 March; 18(3): 143-51.
3. Russo C, Osterburg C, Sirico A, Antonini D, Ambrosio R, Wiirz J M, Rinnenthal J, Ferniani M, Kehrloesser S, Schafer B, Giintert P, Sinha S, Dotsch V, Missero C. Protein aggregation of the p63 transcription factor underlies severe skin fragility in AEC syndrome. *Proc Natl Acad Sci USA*. 2018 Jan. 30; 115(5):E906-E915.
4. Rangel L P, Ferretti G D S, Costa C L, Andrade S M M V, Carvalho R S, Costa D C F, Silva J L. p53 reactivation with induction of massive apoptosis-1 (PRIMA-1) inhibits amyloid aggregation of mutant p53 in cancer cells. *J Biol Chem.* 2019 Mar. 8; 294(10): 3670-3682.
5. Warshauer E, Samuelov L, Sarig O, Vodo D, Bindereif A, Kanaan M, Gat U, Fuchs-Telem D, Shomron N, Farberov L, Pasmanik-Chor M, Nardini G, Winkler E, Meilik B, Petit I, Aberdam D, Paus R, Sprecher E, Nousbeck J. RBM28, a protein deficient in ANE syndrome, regulates hair follicle growth via miR-203 and p63. *Exp Dermatol.* 2015 August; 24(8):618-22.

The invention claimed is:

1. A method for promoting healing of a wound in a subject suffering from ectodermal dysplasia (ED) comprising a step of administering to said subject a therapeutically effective amount of at least one compound which restores the activity of p63, wherein the ectodermal dysplasia is ankyloblepharon-ectodermal defects-cleft lip/palate syndrome (AEC), wherein the at least one compound is PRIMA-1$^{Met}$, and wherein the ED affects at least one cornea.

2. The method of claim 1, wherein the at least one compound is formulated as an ophthalmic drop or an ophthalmic ointment.

3. The method of claim 1, wherein the administering step is performed during a vascular phase of wound healing.

4. The method according to claim 1, wherein the PRIMA-1$^{Met}$ restores the proliferation and development of epithelial cells and epidermal cells.

5. The method according to claim 1, wherein the at least one compound is formulated as a cream, an ointment, or gel.

6. The method according to claim 1, wherein the wounds are caused by skin erosion and/or a scalp infection.

7. The method according to claim 1, wherein the method prevents and/or treats pain caused by the wounds.

8. The method according to claim 1, wherein the mutation is not T533P.

* * * * *